Patented May 17, 1938

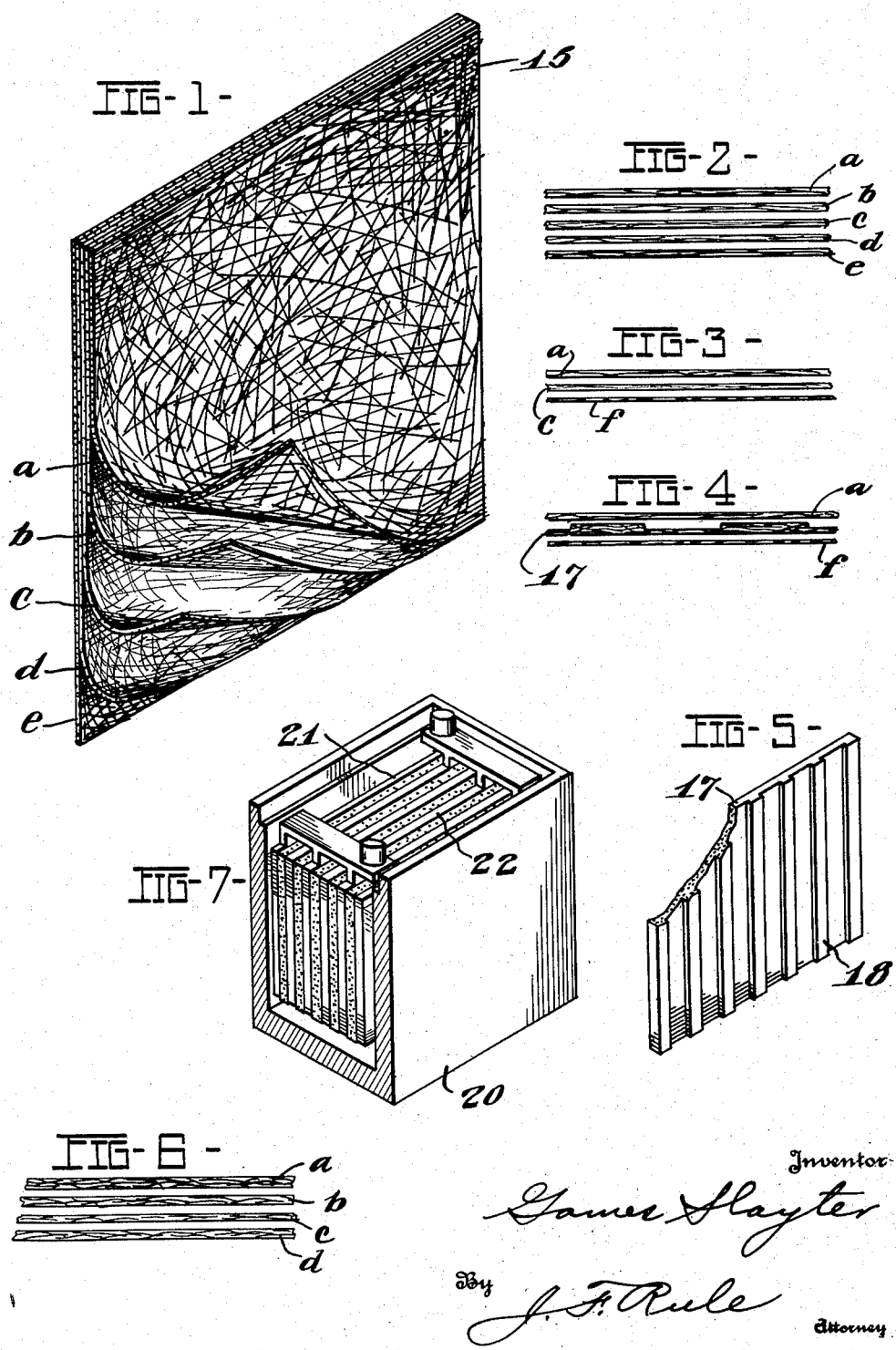

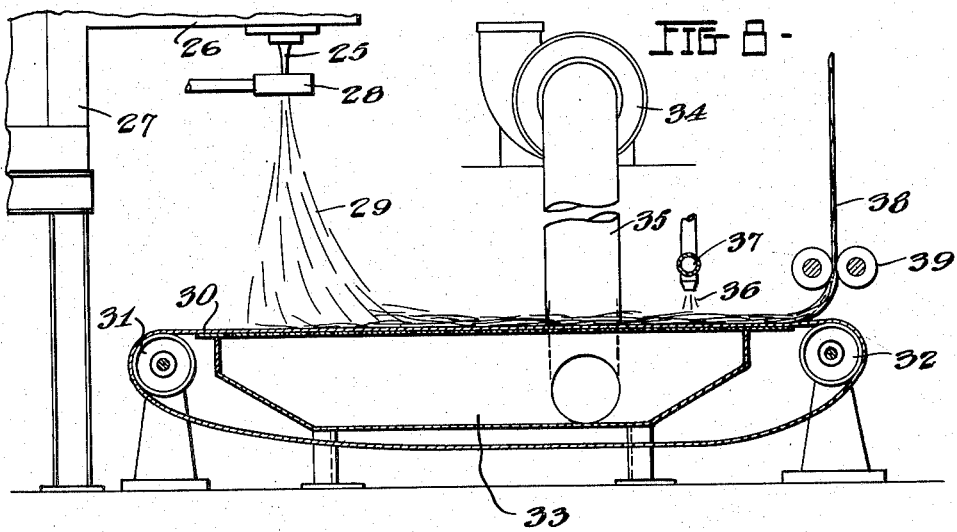
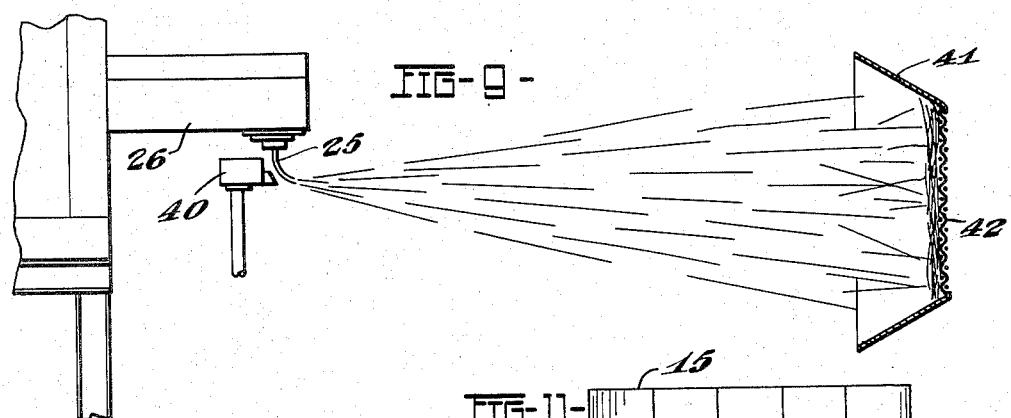
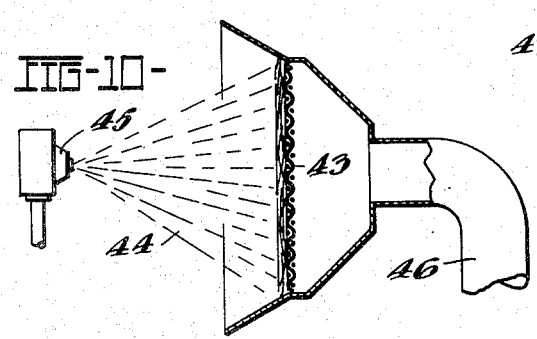
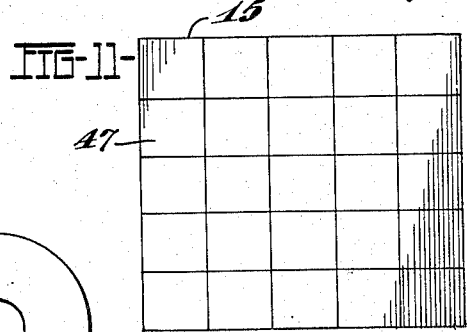

2,117,371

UNITED STATES PATENT OFFICE 2,117,371

BATTERY SEPARATOR PLATE

Games Slayter, Newark, Ohio, assignor to Owens-Illinois Glass Company, a corporation of Ohio Application November 11, 1933, Serial No. 697,617
Renewed October 30, 1936

8 Claims. (Cl. 136—145)

My invention relates to separator plates for use in storage batteries. An object of the invention is to provide an improved separator plate which is efficient and durable, which is at the same time comparatively inexpensive to manufacture, and which is superior in these and other respects to separator plates heretofore known or used. The invention in its preferred form provides a laminated separator plate made of layers of glass wool of different finenesses including one or more layers of extremely fine wool which will prevent the passage of the finely divided lead peroxide or other materials liberated from the active battery plate and thereby prevent the building of short circuiting material across the spaces between the positive and negative plates of the battery. The separator plates may include layers of coarser glass wool which serve to permit the escape of oxygen liberated from the positive plates of the battery and also serve to give the desired body, strength and rigidity to the separator plates.

A further object of the invention is to provide means for preventing the usual dropping and accumulation at the bottom of the battery cell, of the material which is liberated in a finely divided or powdered form from the positive plates of the battery. In conventional types of battery cells, the lead sulphate "paste" gradually disintegrates while the battery is in use and is permitted to drop to the bottom of the cell where it accumulates. The batteries are usually made with a well or space below the plates to catch this sediment so that it will not pile up between the plates and short circuit the battery. This well which is ordinarily several inches deep necessitates a corresponding increase in the height of the battery. An object of the present invention is to overcome this difficulty by providing separator plates comprising a layer or layers of extremely fine resilient glass wool which is held in contact with the active plates, thereby preventing such material from falling and accumulating.

Other objects of the invention will appear hereinafter.

In the accompanying drawings:

Fig. 1 is a perspective view of a multiple ply separator plate, a portion of the plate having the plies separated to illustrate the construction.

Fig. 2 is a view showing the plies or layers before they are brought together.

Figs. 3 and 4 are views similar to Fig. 2, showing modifications.

Fig. 5 is a perspective view of a ribbed plate.

Fig. 6 is a fragmentary view of a four ply plate before the plies are united.

Fig. 7 is a sectional perspective view of a storage battery to which the invention is applied.

Fig. 8 is a sectional elevation view of an apparatus for manufacturing glass wool in sheet form.

Fig. 9 is a similar view of a modification.

Fig. 10 is a sectional elevation of apparatus for applying a binding material to the glass wool and drying the sheets.

Fig. 11 is a diagrammatic view of a sheet before it is cut into individual separator plates.

Referring particularly to Figs. 1 and 2, I have shown a composite battery separator plate 15 comprising a plurality of individual layers or plies $a$, $b$, $c$, $d$ and $e$. Each of these plies consists of a layer or sheet of matted or felted glass wool, said sheets being impregnated with and secured together by a suitable binding medium, as hereinafter set forth.

The middle layer or ply $c$ may consist, for example, of a mat or layer of very fine wool. I have found that wool in which the diameters of the individual fibers is about two or three microns, gives very satisfactory results. The adjoining layers $b$ and $d$ may consist of mats of medium fine wool, the diameters of the fibers being, for example, from twelve to twenty-five microns. The outer layers $a$ and $e$ may consist of comparatively course wool, the diameters of the fibers being, for example, from fifty to seventy-five microns. It will be understood that the terms "fine" and "coarse" as above used are relative terms, the coarsest wool specified being fine in comparison with glass wools generally in use.

The very fine wool forming the middle layer is effective for preventing the passage of the peroxide or finely divided material which is released from the positive plates of the battery while the latter is active, and tends to bridge or build a short circuit across the space between the battery plates. At the present time, battery plates comprising or made of wood, paper or of cellulose material are generally employed for this purpose. Such materials are not entirely satisfactory, owing to the tendency to introduce objectionable impurities into the battery solution and the expensive methods involved for removing such impurities during the process of manufacturing the plates. Moreover, such plates offer considerable resistance to the passage of electric current therethrough. The fine glass wool employed in the present invention is entirely free from impurities and offers comparatively little resistance to the passage of electric current. The layers of coarser wool and particularly the layer adjoining the positive battery plate permits the ready escape of the oxygen gas which is liberated at the positive plate, thus preventing the building up of electrical resistance which is ordinarily encountered in batteries owing to such accumulation of gas on the positive plates.

Fig. 3 illustrates a modification in which the separator plate may be built up of a middle layer c of very fine wool, an outer layer a on one side of coarser wool, and a layer f on the opposite side made of paper or cellulose fiber.

Fig. 5 shows a plate 17 made of very fine or medium fine glass wool and formed with ribs 18 on one side thereof, said ribs preferably forming an integral part of the plate. The shape of this plate may be the same or similar to the conventional separator plate made of wood or like material.

Fig. 4 illustrates a three ply plate, the middle ply consisting of a ribbed mat or plate 17 such as shown in Fig. 5. On one side thereof is a ply a of medium or coarse wool. On the opposite side thereof is a ply f which may consist of a cellulose material or of glass wool.

Fig. 6 illustrates the separate plies of a four ply separator plate comprising an intermediate layer c of very fine wool, for example, two to three microns, layers b and d of medium fine wool (twelve to twenty-five microns), and an outer layer a of comparatively coarse wool (fifty to seventy-five microns).

Fig. 7 illustrates a storage battery 20 comprising positive plates 21 alternating with negative plates 22. Separator plates made of or comprising glass wool as above described are interposed between the adjoining plates. I have found in practice that the glass wool separator plate comprising a layer of very fine wool, such as above described, in contact with the positive plate of the battery, serves to prevent the fine material which is formed by the chemical reduction of the battery plate from dropping down and accumulating on the floor of the battery. It is, therefore, unnecessary to provide the usual space beneath the battery plates for the accumulation of such material, so that the size of the battery is materially reduced, and the usual cleaning operations for removing such accumulations are unnecessary. The separator plates, made as above described, are highly resilient and elastic, and when placed between the battery plates may be held under compression. Reliable and intimate contact between the surfaces of the separator plates and the adjoining battery plates is thus maintained.

I have found that a very satisfactory separator plate for some types of battery may consist of a single ply layer or mat made of rather fine glass wool, the filaments of which may range from five to twelve microns in diameter.

Fig. 8 illustrates an apparatus which may be used in making the glass wool mats. As here shown, a stream 25 of molten refined glass flows from the bottom outlet of a container 26 which, for example, may be a forehearth extension of a glass melting and refining tank 27. The stream 25 flows through a blower 28 which directs a blast of steam or other gas under considerable pressure against the glass and thereby draws or reduces it to fine threads or filaments 29 which are instantaneously cooled and solidified and accumulate on an endless conveyor 30. The conveyor, which may consist of a metal screen, runs over rolls 31 and 32 and may be continuously driven by an electric motor (not shown).

Beneath the upper lead of the conveyor is a suction chamber 33 from which the air is continuously exhausted by means of a suction fan 34 having a pipe connection 35 to said chamber. A binding material 36, as, for example, a solution of latex, is sprayed onto the wool as it passes over the conveyor, as by means of a spray nozzle 37. The air drawn through the wool into the suction chamber 33 serves to dry or partially dry the binding material. The web or mat 38 of wool after it leaves the conveyor 30 passes between a pair of pressure rolls 39 whereby it is compressed to the desired thickness and density, the binding materially serving to retain it in its compressed condition. The fineness of the wool made by the apparatus just described can be varied within rather wide limits by varying the temperature of the stream of glass 25. The thickness and density of the mat may be varied and controlled by varying the speed of the conveyor 30 and by adjustably varying the distance between the rolls 39.

Fig. 9 illustrates a modified form of apparatus particularly adapted for making fine wool. In this instance a blower 40 blows the glass in a horizontal direction. The wool accumulates within a holder 41 comprising a vertical screen 42. When the wool has accumulated to the desired thickness, for example, one inch or one and one-half inches, the blowing is discontinued and the mat is taken off the screen and may be cut into squares or to definite dimensions. The mat may then be separated or peeled into layers of the desired thickness.

These layers are placed on a vertical screen 43 (Fig. 10) of a suction device. A binding material 44 is now blown onto the wool by means of a spray gun 45. At the same time air is drawn through the screen 43 and the mat of wool thereon by means of a suction fan (not shown) connected to a suction pipe 46. The air passing through the screen 43 and the mat thereon, drys the latex or other binding material which forms a thin coating over each thread or fiber of the glass wool. The mat is then removed from the screen 43 and may be passed between a pair of steel rollers, whereby it is compressed to the desired thickness. If desired, two or more of these mats may be laid together and again passed between a pair of rollers for further compressing them and causing the several layers or plies to adhere. The mat 47 thus formed (Fig. 11) may then be cut into individual squares or plates 15.

The ribbed plate shown in Fig. 5 may be made by first forming a plain plate by the process above described and then placing thereon strips for forming the ribs 18. By then passing the plate between a pair of rolls the said strips are caused to adhere to the body of the plate, the rubber or other binding material securely uniting the parts.

Other methods of making the separator plates than those herein described may be employed, if desired. The number of plies or layers comprised in the separator plate, their relative arrangement, the fineness of the wool comprising the individual layers and the binding material employed, may be varied as required for best results with different types of batteries and under varying conditions met with in practice.

I have found that in practice it is sometimes desirable to coat the separator plates with a thin layer of agar-agar or other gelatinous substance which will give a smooth surface to the plates. This smooth surface materially facilitates the handling of the plates in the processes of assembling them with the battery plates. The agar-agar quickly dissolves and disappears when subjected to the battery solution.

Modifications may be resorted to within the spirit and scope of my invention.

What I claim is:

1. A battery separator plate comprising a plurality of plies consisting of glass wool, the wool in said plies being of different finenesses.

2. A battery separator plate comprising a plurality of plies consisting of glass wool, the wool in said plies being of different finenesses, and a binding material impregnating the wool and uniting said plies.

3. A battery separator plate comprising a layer of fine glass wool, and an adjoining layer of comparatively coarse glass wool.

4. A multiple ply battery separator plate comprising inner and outer plies of fine glass wool, and an outer ply of comparatively coarse glass wool.

5. A battery separator plate comprising a mat of fine glass wool, the individual fibers of which are about from two to three microns in diameter, and an overlying mat of comparatively coarse glass wool.

6. A battery comprising positive and negative plates, an interposed separator plate comprising a layer of matted fine glass wool in contact with the negative plate and a layer of comparatively coarse matted glass wool in contact with the positive plate.

7. A battery comprising parallel spaced positive and negative plates arranged in alternation, interposed separator plates, each separator plate comprising an outer layer of fine resilient matted glass wool in contact with a negative plate, and an outer layer of comparatively coarse matted glass wool in contact with a positive plate, said separator plates being held under compression between the said positive and negative plates.

8. A battery separator plate comprising a mat of fine glass wool, the individual fibres of which are not more than about from two to three microns in diameter, and an overlying mat of comparatively coarse glass wool.

GAMES SLAYTER.